United States Patent [19]

Lebreton

[11] Patent Number: 4,979,755
[45] Date of Patent: Dec. 25, 1990

[54] FLOW DAMS IN LABYRINTH SEALS TO IMPROVE ROTOR STABILITY

[75] Inventor: Albert F. Lebreton, Longwood, Fla.

[73] Assignee: Westinghouse Electric Corp., Pittsburgh, Pa.

[21] Appl. No.: 157,552

[22] Filed: Feb. 18, 1988

[51] Int. Cl.⁵ .................. E21B 33/00; F01D 5/20; F16J 15/44

[52] U.S. Cl. .......................... 277/1; 277/3; 277/53; 277/56; 277/192; 415/119; 415/173.5; 415/174.5

[58] Field of Search ............... 277/3, 53, 54, 55, 56, 277/57, 133, 134, 1, 192; 415/119, 170 R, 172 A, 173.5, 174.5

[56] References Cited

U.S. PATENT DOCUMENTS

| | | |
|---|---|---|
| 4,114,059 | 9/1978 | Albaric et al. ................. 277/3 |
| 4,257,617 | 3/1981 | Hill ................................. 277/3 |
| 4,273,510 | 6/1981 | Ambrosch et al. ........... 415/119 |
| 4,370,094 | 1/1983 | Ambrosch et al. ........... 415/119 |
| 4,420,161 | 12/1983 | Miller ........................... 277/56 |
| 4,436,311 | 3/1084 | Brandon ....................... 277/56 |

Primary Examiner—William A. Cuchlinski, Jr.
Assistant Examiner—Scott Cummings

[57] ABSTRACT

Methods and apparatus for preventing swirl in a stem turbine having an annular-shaped stationary portion through which extends in regions of differential pressure a rotatable shaft include flow dams situated perpendicularly with respect to a plurality of spaced-apart annular teeth which extend radially inward from the stationary portion toward the shaft to within close proximity thereof, each adjacent pair of teeth forming a cavity there between. By damming the cavities, a circumferential stem flow is substantially minimized, thereby preventing the conditions necessary for the inducement of swirl.

18 Claims, 1 Drawing Sheet

U.S. Patent  Dec. 25, 1990  4,979,755
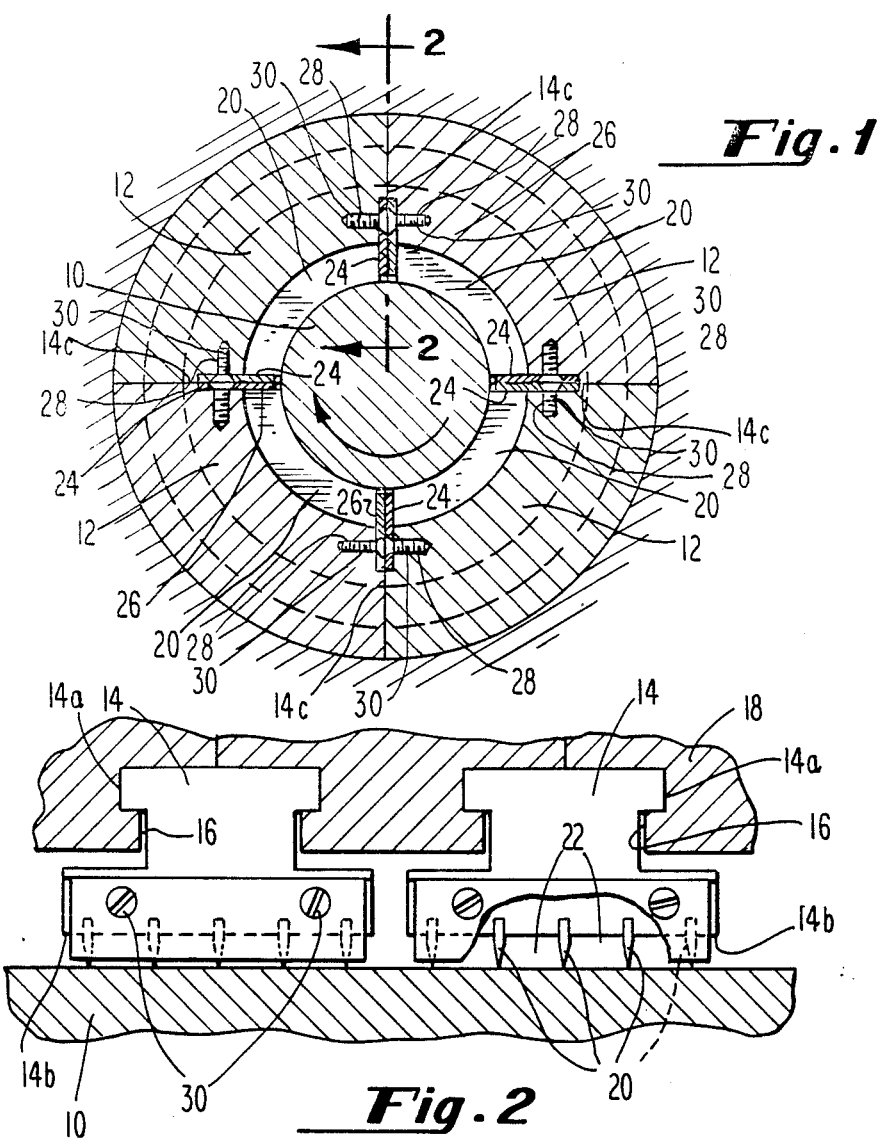
*Fig. 1*
*Fig. 2*
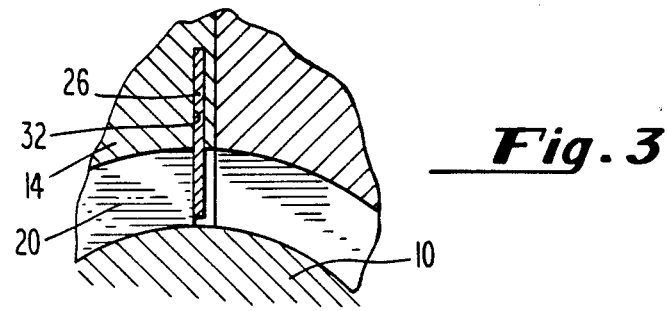
*Fig. 3*

FLOW DAMS IN LABYRINTH SEALS TO IMPROVE ROTOR STABILITY

BACKGROUND OF THE INVENTION

This invention is related generally to labyrinth sealing apparatus of the type used in steam turbines to minimize leakage of steam between the regions of differential pressure through which a rotor of the turbine extends, and more particularly to methods and apparatus for minimizing the effects of steam whirl in such turbines through the addition of flow dams in such sealing apparatus.

As is well known, non-contacting packing ring labyrinth seals are conventionally used in steam turbines at selected axial positions along the length of the turbine rotor to minimize steam leakage between regions of differential pressure. Such packing ring labyrinth seals typically include a plurality of spaced-apart annular teeth, known as seal strips, which extend radially inward from the turbine casing suspended from seal carriers. The distal end of each such seal strip is disposed in close proximity to the rotating surface of the rotor, leaving only a very small clearance therebetween, in order to provide a minimum-leakage seal. These types of seals are very effective, and are utilized not only to prevent steam from leaking out around the turbine shaft, but are also utilized to prevent leakage of steam between stages of the turbine where the shaft passes through the diaphragms.

As is also well known, a certain amount of steam continuously enters and exits the packing ring structure with a flow component generally along the shaft in an axial direction. However, the steam flow entering and exiting the packing ring structure also has a component, typically referred to as "swirl", in the circumferential direction.

It is a generally accepted notion that swirl results from two principal causes: (1) a whirling or circumferential component imparted by the most adjacent upstream turbine stage; and, (2) a circumferential flow component produced by the drag effect of the rotating shaft. Although the latter such component is always in the direction of rotor rotation, the former such whirling component may be in either direction depending upon the operating parameters of the most adjacent upstream turbine stage. For example, it is known that the turbine stage that supplies steam to the end packing seals in turbines with double flow first stages produces a forward running swirl (i.e., in the direction of shaft rotation) at high loads.

At low loads, or in cases where the rotor is operating at less than full-speed, tests have shown that steam flowing circumferentially in the space above the rotor between the seal legs has a highly destabilizing effect on the rotor whirl when such circumferential flow is in the same direction as the direction of rotor rotation. On the other hand, steam flow in the same seal space opposite to rotor rotation has a stabilizing effect on rotor whirl. As is readily apparent, therefore, it is primarily rotational instabilities caused by swirl which lead to the above described destabilizing effect on rotor whirl.

Steam flow within the seal structure is known to produce lateral forces on the turbine rotor due to asymmetrical pressure gradients which arise in the seal chambers. In some cases where it is known that forward swirl within the shaft end seals is strong, the turbine rotor begins to experience rotational instability related to the steam whirl conditions. In particular, such as in turbines of the double flow type discussed herein above, there is a susceptibility to such rotational instabilities at higher load levels associated with forward swirl within the seals. More often than not, however, such rotational instabilities cannot be discovered until the installation of the turbine is complete and a full load cannot be achieved due to the levels of vibration which are usually experienced when attempting to reach full load under conditions conducive to the generation of swirl. It would, therefore, be desirable to provide a method and apparatus for minimizing steam whirl in turbines which may be installed in the field as a retrofit to existing apparatus. In such a manner, downtime for installation of the apparatus would be minimized while at the same time further downtime for diagnosis and repair of problems related to rotor instabilities brought about by swirl would be prevented.

One attempt to deal with the above described problem, although not necessarily from a retrofit point of view, is disclosed in U.S. Pat. No. 4,273,510, issued June 16, 1981 to Ambrosch et al. In that patent, Ambrosch et al. disclose a method of and devices for avoiding rotor instability to increase the dynamic power limit of rotary fluid machines such as turbines and compressors which have contact-free seals in the gaps between the rotating and nonrotating elements of the machine in which the rotary flow of fluid in the gap is modified either by axial baffles in the gap or by introducing a fluid medium into the gap thereby to decrease, eliminate, or even reverse the force component acting on the rotating element and disposed 90° ahead of the oscillation deflection of the rotating element. One problem with such an arrangement, however, is that it is complex and not readily adaptable to be retrofitted within an installed turbine. In particular, where the method and devices of Ambrosch et al. require the introduction of another fluid medium into the gap to decrease, eliminate, or even reverse the force component acting on the rotating element, implementation of such secondary flow to function properly would not be without difficulty.

Another prior art approach to the stabilization of turbine rotors subjected to steam whirl through modifications to the labyrinth seals of such rotors is disclosed in U.S. Pat. No. 4,420,161, issued Dec. 13, 1983 to Miller. Miller teaches the use of a fixed circumferential row of spaced-apart flow directing vanes encircling the rotor on the upstream side of a plurality of fixed, spaced-apart annular teeth which surround the shaft of the turbine whereby each tooth has a radially inner edge in very close proximity to the rotor surface. Each vane of the row extends radially inward to within very close proximity of a raised annular land on the shaft surface just opposite the vane row. Miller further teaches that the row of flow directing vanes and the raised land cause substantially the entire quantity of steam which enters the seal to pass through the row of flow directing vanes, whereby steam flow within the seal is caused to have a retrograde component counter to the direction of shaft rotation which produces stabilizing forces on the rotor to neutralize destabilizing forces caused by swirl.

An apparatus utilizing such flow directing or "preswirl" vanes, however, would suffer from two primary disadvantages. First of all, the preswirl obtained by the flow directing vanes would be easily overcome by the viscous drag of the rotor on the fluid as the steam passes through the narrow gap between the rotor and seals. In addition, the velocity of the steam passing through the preswirl vanes would be necessarily small because the labyrinth seal is designed to minimize axial flow by use of small radial clearances between the seal leg and rotor, and because the radial height of the preswirl vanes would be large by comparison. Accordingly, it would be more desirable to provide a method and apparatus which would reduce circumferential fluid flow in the cavities between the seal legs to a very small quantity.

With such goal in mind, U.S. Pat. No. 4,370,094, issued Jan. 23, 1983 to Ambrosch et al. discloses flow guiding structural components in the form of deviating plates, baffles, fins, profiles, passages, or the like which are arranged in the gap region in front of, or in the seals. The flow guiding structural elements, according to Ambrosch et al., are arranged so that the mean circumferential component of the gap flow is so decreased that the force component of the pressure distribution which runs ahead of the oscillation deflection of the rotor oscillation by 90° is reduced, eliminated, or reversed in its direction. In particular, flow guiding structural elements 6a (as shown in FIG. 4 of Ambrosch et al.) each of which have an inward radial extent within the gap slightly less than the radial extent of the seal legs are disposed between the seal legs, ostensibly to reduce differentials in fluid pressure around the gap thereby resulting in a reduction of self-excited oscillations of the rotor and allowing an increase in the power imparted to the blades of the turbine. However, the flow guiding structural elements 6a as taught in Ambrosch et al. still suffer from an inability to adequately reduce the circumferential flow known as swirl since they do not sufficiently cover the cavities between the seal legs. It would, therefore, be more desirable to provide a method and apparatus for stabilizing steam turbine rotors which substantially covers the cavities between the seal legs, thereby minimizing circumferential fluid flow causing swirl.

SUMMARY OF THE INVENTION

Accordingly, it is a general object of the present invention to provide a method and apparatus for stabilizing a rotor of a steam turbine. More specifically, it is an object of the present invention to provide a method and apparatus for stabilizing the rotor of a steam turbine which utilizes labyrinth seals to minimize steam leakage between regions of differential pressure through which the rotor extends.

Another object of the present invention is to provide a method and apparatus for stabilizing such a turbine rotor by minimizing circumferential fluid flow between the seal legs of such labyrinth seals.

Still another object of the present invention is to provide a method and apparatus to substantially dam such seal legs.

Briefly, these and other objects according to the present invention are accomplished in a steam turbine, including a rotor, having labyrinth seals for minimizing leakage of steam between regions of higher and lower pressures between which the rotor extends by flow dams for minimizing circumferential fluid flow around the rotor. As is conventional, the labyrinth seals include a plurality of seal carriers which fit within grooves formed in a stationary portion of the turbine. Each of the seal carriers further include a plurality of spaced-apart annular teeth, otherwise known as seal legs, encircling the rotor and extending radially inward to within close proximity of the rotor surface to define chambers or cavities between the teeth. In order to minimize the circumferential fluid flow in such cavities which leads to swirl, and ultimately to prevent rotor instabilities caused by such swirl, a flow dam is affixed to each seal carrier perpendicularly to the seal legs. Each such flow dam is preferably formed of the same material as the seal legs, and is substantially the same size as such seal legs insofar as the extent to which it extends radially inward towards the rotor surface, thereby leaving the same small gap between the flow dam and the rotor surface as the gap left between the rotor surface and the seal legs.

The above and other objects, advantages and novel features according to the present invention will become more apparent from the following detailed description of the preferred embodiments when considered in conjunction with the accompanying drawings wherein:

BRIEF DESCRIPTION OF THE DRAWINGS

FIG. 1 is a sectional view, normal to the axis of rotation of a turbine including one of flow dams according to the present invention;

FIG. 2 is an enlarged, somewhat simplified partial sectional view of the flow dams shown in FIG. 1 taken along the lines 2—2; and FIG. 3 is a sectional view of another flow dam according to a second embodiment of the present invention.

DETAILED DESCRIPTION OF THE PREFERRED EMBODIMENTS

Referring now to the drawings, wherein like characters designate like or corresponding parts throughout the several views, there is shown in FIG. 1 a rotor of a steam turbine which includes a rotating shaft 10 conventionally extending through regions of differential, i.e., higher and lower fluid pressures. While the full turbine rotor is not illustrated, it will be understood that the shaft 10 is but a portion of the rotor which includes a full compliment of flow directing components (e.g., rotating blades) for extracting power of rotation from the motive fluid.

As shown in greater detail in FIG. 2, displaced axially along the shaft 10 is a plurality of seal rings 12. The exact number of seal rings utilized depends upon a number of factors including the pressure to be sealed and the desired sealing efficiency. However, since the number of seal rings employed is not material to a thorough understanding of the present invention, only two such seal rings 12 will be shown and herein after described.

Each seal ring 12 includes a plurality of seal carriers 14 which are fit within corresponding grooves 16 formed in the stationary portion 18 of the turbine in order to circumferentially encompass the shaft 10 and thereby minimize fluid leakage between regions of differential pressure through which the shaft 10 extends. For example, the seal rings 12 may form the shaft end seals for the high pressure end of a conventional steam turbine. As is also conventional, each seal carrier 14 includes a spring backing (not shown) to force the seal carrier 14 radially inward towards the shaft 10. Accordingly, the seal carriers 14 further include shoulder portions 14a in order to limit their inward travel.

Mounted on a radially inward side 14b of each seal carrier 14 is a plurality of spaced-apart annular teeth 20, also known as "seal legs", which encircle the shaft 10. The teeth 20, as is conventional in such labyrinth seals, may be correspondingly mounted opposite raised lands (not shown) in order to improve the sealing effectiveness of the overall seal. Furthermore, the teeth 20 are not in contact with the surface of the shaft 10 but nevertheless extend radially inward to within very close proximity thereof to maintain a small working clearance between the shaft 10 and the teeth 20, thereby providing an effective seal against steam flow. An annular space, variously referred to as a chamber or cavity 22, is defined between individual pairs of the teeth 20.

As is well known, steam flowing circumferentially of the shaft 10 within the cavities 22 has a highly destabilizing effect on rotor whirl when it is in the same direction as the rotor rotation (shown by the arrow in FIG. 1). Steam flow in the same seal space (i.e., the cavities 22) opposite to rotor rotation, on the other hand, has a stabilizing effect on rotor whirl. In the destabilizing mode, the rotor can experience rotational instability known as swirl which may be desirably avoided through use of the method and apparatus described herein below.

In accordance with one embodiment of the present invention, each seal carrier 14 along its leading edge 14c (FIG. 1) is formed with a slot 24 for installation thereon of a flow dam 26. The seal carriers 14 may further include a plurality of threaded bores 28 for engagement with correspondingly threaded fasteners such as the flat-head machine screws 30 shown in FIGS. 1 and 2. Each of the flow dams 26 are mounted perpendicularly to the seal legs 20 within their respective slots 24, and attached to the seal carriers 14 by insertion of the screws 30 through countersunk holes 26a formed in the flow dams 26. The screws 30 are then tightened to hold the flow dams 26 in place, thereby substantially minimizing circumferential fluid flow in the cavities 22, such fluid flow more often than not leading to the undesirable condition of swirl.

Referring now to FIG. 3, a second embodiment of the flow dams 26 according to the present invention will be described. The flow dams 26 shown in FIG. 3, like those shown in FIGS. 1 and 2, are installed at the leading edge 14c of each seal carrier 14( and at other circumferential locations as desired), but are so installed press-fit within a groove 32 in a similar manner as that which is employed for mounting of the seal legs 20.

As is readily apparent, the method and apparatus shown in FIGS. 1 and 2 is easily adaptable for field installation, thereby lending itself to retrofit installations, whereas the method and apparatus shown in FIG. 3 is more suitable for installation at the time of assembly the seal legs 20 within the seal carriers 14. In either case, however, the flow dams 26 are suitably formed of a similar material as that used for the seal legs 20 (e.g., stainless steel), with a similarly sized thickness of on the order of approximately 0.080 inches. The length of each flow dam 26 is, of course, dependent upon the width of the seal carrier 14.

Obviously, many modifications and variations of the present invention are possible in light of the above teachings. For example, a flow dam 26 may not only be installed along the leading edge 14c of each seal carrier 14, but also another flow dam 26 may be installed along a trailing edge of such seal carriers 14, or anywhere in between the leading and trailing edges as desired. In such a manner, circumferential flow of steam within the cavities 22 between the seal legs 20 is substantially minimized, thereby preventing the occurrence of rotational instabilities caused by swirl. It is, therefore, to be understood that the present invention may be practiced otherwise than as specifically described herein without departing from the true spirit and scope thereof. Accordingly, the appended claims are intended to cover all such modifications.

I claim:

1. A labyrinth seal for a steam turbine having an annular-shaped stationary portion through which extends in steam flow regions of differential pressure a shaft rotating about an axis, comprising:
    a seal ring including a plurality of seal carriers adapted to be attached to the stationary portion extending radially inward therefrom towards the rotating shaft;
    a plurality of seal legs attached to each said seal carrier, said seal legs being spaced-apart axially disposed upon an inner face of said seal carrier extending radially inward therefrom to respective points closely proximate to said shaft; and
    a flow dam attached perpendicularly across said seal legs along a leading edge of each said seal carrier, each said flow dam extending radially inward from its respective seal carrier to a point in close proximity to the radial inner edge of each seal leg, thereby substantially reducing a circumferential component of the steam flow between said seal legs.

2. The seal according to claim 1, further comprising another flow dam attached to said seal carrier along a trailing edge thereof.

3. The seal according to claim 1, wherein each said seal carrier further comprises:
    a slot formed in said leading edge, said flow dam being inserted within said slot perpendicular to said seal legs.

4. The seal according to claim 3, wherein said slot further comprises threaded means for attaching said flow dam in said slot.

5. The seal according to claim 1, wherein each said seal carrier further comprises a groove formed in a radially inward face proximate to said leading edge of said seal carrier, said flow dam being inserted within said groove.

6. The seal according to claim 5, wherein said flow dam is press fit within said groove.

7. An improved labyrinth seal for minimizing leakage of steam between a region of higher pressure and a region of lower pressure in a steam turbine of the type having a stationary portion and a rotor extending through the regions, a plurality of spaced-apart annular teeth affixed to a plurality of seal carriers attached to the stationary portion of the turbine between the higher and lower pressure regions and encircling the rotor substantially coaxially therewith to define chambers between the teeth, each tooth of said plurality of teeth extending radially inward towards the rotor within very close proximity thereof, the improvement comprising:
    at least one flow dam attached to each said seal carrier and extending radially inward therefrom, across the teeth of said seal carrier to the radial inner edge of each tooth, said at least one flow dam disposed perpendicularly to the teeth and covering each of the chambers, thereby substantially reducing a flow of steam in a circumferential direction within said chambers.

8. The improvement according to claim 7, wherein said at least one flow dam extends radially inward from the stationary portion of the turbine towards the rotor to substantially the same extent as each of the teeth.

9. Apparatus for preventing steam swirl in a steam turbine having an annular-shaped stationary portion through which extends in regions of differential pressure a shaft rotating about an axis, comprising:
   a plurality of seal legs, disposed spaced-apart along the axis between each of the regions, extending radially inward from the stationary portion towards the shaft to within a close proximity thereof;
   attaching means for attaching each of said plurality of seal legs to said stationary portion of the turbine, said attaching means including a plurality of seal carriers; and
   flow dam means, affixed to said seal carriers, for reducing a flow of steam circumferentially about said shaft, said flow dam means extending radially inward at least as far as the radial inner edge of each said seal leg, and extending perpendicularly across said plurality of seal legs, said flow dam means substantially reducing a flow of steam circumferentially about said shaft between respective pairs of said plurality of seal legs.

10. The apparatus according to claim 9, wherein said attaching means comprises:
    a plurality of spaced-apart grooves formed in the stationary portion of the turbine, each said groove being disposed relative to a boundary between a pair of the regions; and
    said plurality of seal carriers formed along an outer face thereof to fit within said grooves, each of said seal carriers having formed on a radially inward face thereof with a plurality of axially spaced grooves for reception of respective ones of said seal legs.

11. The apparatus according to claim 10, wherein said flow dam means comprises a plurality of strips of substantially the same size as each said seal leg, each said strip being attached to a leading edge, with respect to a direction of the rotation, of a respective one of said seal carriers.

12. The apparatus according to claim 11, further comprising another plurality of strips of substantially the same size as each said seal leg, each said other strip being attached to a trailing edge, with respect to said direction of rotation, of a respective one of said seal carriers.

13. A method of preventing swirl in a steam turbine having an annular-shaped stationary portion through which extends in regions of differential pressure a shaft rotating about an axis, wherein the stationary portion includes a plurality of spaced-apart grooves formed therein, each of the grooves being formed relative to a boundary between a pair of the regions, a plurality of seal carriers attached to the stationary portion within each of the grooves, and a plurality of spaced-apart annular teeth affixed to each of the seal carriers extending radially inward towards the shaft in close proximity thereto, adjacent pairs of the teeth defining cavities therebetween, the method comprising the step of damming a flow of steam circumferentially about the shaft with each of the cavities by providing a flow dam for each of said seal carriers, said flow dam extending at least across a predetermined edge of each said seal carrier and extending radially inward from said seal carrier as far as the radial inner edge of each said seal leg and extending across said seal legs.

14. The method according to claim 13, wherein said damming step comprises the steps of:
    forming a plurality of flow dams, each said flow dam comprising a strip of substantially the same size as said teeth; and
    affixing each said flow dam to a respective one of the seal carriers along said predetermined edge thereof.

15. The method according to claim 14, wherein said predetermined edge comprises a leading edge with respect to a direction of rotation of the shaft.

16. The method according to claim 15, further comprising the step of affixing another one of said strops to each of the seal carriers at trailing edges thereof with respect to a direction of rotation of the shaft.

17. An improved method of sealing between regions of differential pressure in a steam turbine having an annular-shaped stationary portion with a rotatable shaft extending through the regions within the stationary portion, wherein the method comprises the steps of:
    forming a plurality of grooves on a radially inward face of the stationary portion, each said groove defining a boundary between adjacent pairs of the regions;
    providing a plurality of seal carriers adapted for insertion within each said groove;
    inserting said seal carriers within said grooves;
    affixing a plurality of spaced-apart annular teeth to each said seal carrier, each said tooth extending radially inward from said seal carrier to within close proximity of the shaft, adjacent pairs of the teeth defining a cavity therebetween;
    providing a plurality of flow dams, each said flow dam having a thickness and width substantially the same as the teeth; and
    affixing respective ones of said flow dams to a leading edge of each said seal carrier such that each said flow dam is adapted to extend radially inward from its respective seal carrier to the radial inner edge of each tooth, each said flow dam being disposed perpendicularly to and extending across the plurality of spaced-apart annular teeth affixed to said respective seal carrier.

18. The method according to claim 17, further comprising the step of affixing a respective one of said flow dams to a trailing edge of each said seal carrier, said flow dam being disposed perpendicularly to said plurality of spaced-apart annular teeth.

* * * * *